United States Patent [19]
Busch

[11] 3,944,731
[45] Mar. 16, 1976

[54] VIDEO SPECIAL EFFECTS GENERATOR

[75] Inventor: Albert E. Busch, Bloomington, Ind.

[73] Assignee: Sarkes Tarzian, Inc., Bloomington, Ind.

[22] Filed: Mar. 3, 1975

[21] Appl. No.: 554,715

[52] U.S. Cl.............................. 178/6.8; 178/DIG. 6
[51] Int. Cl.².......................................... H04N 5/22
[58] Field of Search........................ 178/DIG. 6, 6.8

[56] References Cited
UNITED STATES PATENTS

| | | | |
|---|---|---|---|
| 3,758,712 | 9/1973 | Hudson | 178/6.8 |
| 3,780,223 | 12/1973 | Perry | 178/DIG. 6 |

*Primary Examiner*—Howard W. Britton
*Attorney, Agent, or Firm*—Mason, Kolehmainen, Rathburn & Wyss

[57] ABSTRACT

A digital special effects generator combines two or more video signals under the control of a control lever or programmable hardware. Forward and reverse horizontal, vertical and corner wipes as well as a QUAD effect where four video signals may be simultaneously displayed are among the effects obtainable. An improved analog-to-digital converter is utilized to generate a digital signal representative of the position of the control lever, and a digital quantizer is used in conjunction with the analog-to-digital converter to eliminate jitter in the digital signal. The transition between video signals is controlled by comparing the digital lever position representative signal with a digital signal representative of the scanning beam position, and providing a video transition signal when a predetermined relationship between the two digital signals is reached. Border video switching circuitry utilizing a digital counter to control border width is used to generate a variable width, variable pattern border between the video displays.

27 Claims, 10 Drawing Figures

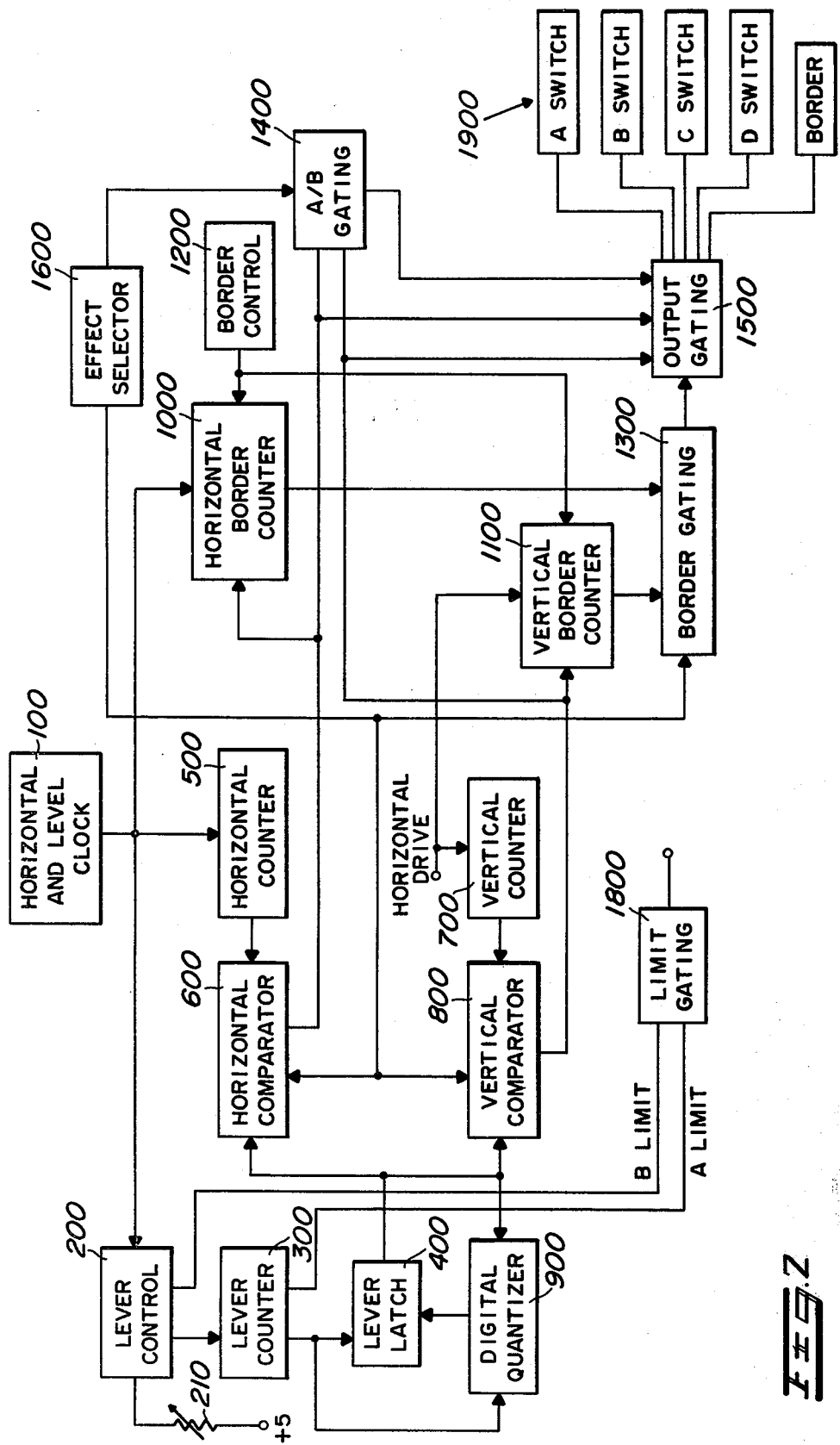

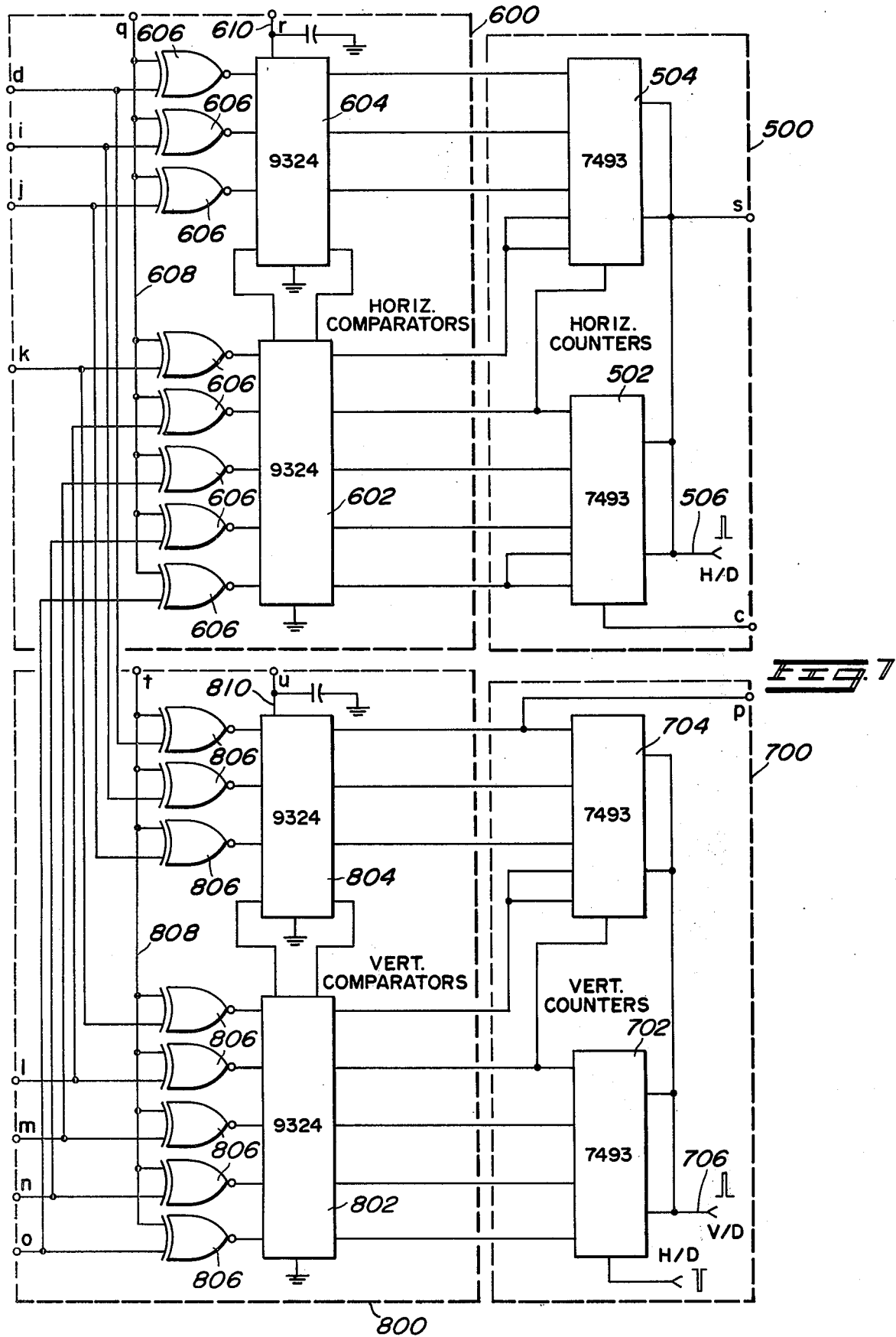

VIDEO SPECIAL EFFECTS GENERATOR

BACKGROUND OF THE INVENTION

The present invention relates generally to special effects generators for use in combining multiple input video signals into a single video output signal, and more particularly, to such a generator that uses digital logic circuitry to generate the special effects.

Special effects generators are used in television studios to combine several video signals into a single composite video signal. A typical special effects generator combines a portion of one signal with portions of one or more other signals under the control of one or more control levers. A typical special effect is a "horizontal wipe" in which portions of the images are represented by two input signals are combined into a single output image with a vertical line separating the two image portions. The horizontal position of the vertical line is determined by the position of a manually actuated lever. The line can be made to proceed horizontally across the screen in response to movement of the lever to provide a "wiping" effect where one image portion is gradually displaced by the other image portion. Other similar special effects are "vertical wipes" in which a horizontal line separating the image portions can be moved vertically across the screen, and "corner wipes" where a portion of one video signal is displayed in one corner of the output image and a portion of another video signal comprises the rest of the output image. The corner image is generally rectangular in shape, and has a size that is controllable by the position of a control lever. The size of the corner image can be made to increase in size in response to movement of the control lever until the corner image comprises the entire output image. Another special effect is a "QUAD effect" wherein portions of four video images can be combined into a single output image with each of the four image portions being displayed in a separate quadrant of the output image. The relative sizes of the four images comprising the output image can be varied by actuating a control lever which adjusts the position of the horizontal and vertical lines separating the four images.

Special effects generators may conveniently be classified into two categories: analog and digital. Analog special effects generators utilize analog signal processing circuitry including horizontal and vertical sawtooth and parabolic generators that generate analog potentials proportional to the horizontal and vertical positions of a scanning spot. Analog comparators are used for comparing various combinations of these analog signals with internally generated control signals proportional to the position of a lever or other control. Switching signals are generated as a result of the analog comparisons for operating electronic switches that apply portions of various video signals to a transmission medium in accordance with the result of the comparison.

Analog special effects generators are generally difficult to align and suffer from other drawbacks including time and temperature drift and susceptibility to noise. Consequently, digital special effects generators have been developed that eliminate most of the problems associated with analog special effects generators. One such digital special effects generator is described in U.S. Pat. No. 3,821,468 issued to Albert E. Busch on June 28, 1974 and assigned to the same assignee as the assignee of the present invention. The above Busch patent is incorporated herein by reference.

The apparatus described in the Busch patent provides a wide variety of special effects including diamonds, circles, horizontal and vertical wipes and others. Consequently, the circuitry required to provide these effects results in a rather complex and costly system. It has been found that for many applications, some of the special effects provided by the generator described in the Busch patent, such as the circle which require complex circuitry to implement, are not necessary. It has also been found that other effects that are relatively easy to implement and not provided by the generator described in the Busch patent are desirable. Such effects include the corner wipe and the QUAD effect described above. Furthermore, new circuit developments have made it possible to simplify the circuitry of the prior art generators while simultaneously improving performance.

SUMMARY OF THE INVENTION

Accordingly, it is an object of the present invention to provide an improved digital special effects generator that overcomes many of the disadvantages of the prior art analog and digital special effects generators.

It is an other object of the present invention to provide a simplified digital special effects generator that provides useful special effects not provided by more complex generators.

It is yet another object of the present invention to provide a digital special effects generator that provides a corner wipe effect.

It is still another object of the present invention to provide a digital special effects generator that provides a fixed and a variable QUAD mode of operation.

More specifically, it is an object of the present invention to provide a digital special effects generator utilizing a digital quantizer for eliminating jitter in the transition between video signals and a digital border counter for providing a stable border between the video signals Another object of the invention is to provide improved circuitry for generating the digital lever position representative signal and for electronically reversing the direction of operation of the lever.

In accordance with a preferred embodiment of the invention a lever is provided for controlling the wiping action of the generator. The position of the lever is converted to a digital signal by an analog-to-digital converter. The analog-to-digital converter employs a source of clock pulses and a counter for counting the clock pulses The number of clock pulses is determined by the position of the lever which operates a potentiometer that controls the width of an ouput pulse generated by a variable pulse width producing circuit. The output pulse from the variable width pulse producing circuit is combined with a fixed duration output pulse from a fixed width pulse producing circuit and with a limit pulse from a wipe limit pulse producing circuit in a circuit that renders the counter operative to count clock pulses only upon the coincidence of the three pulses from the three pulse producing circuits. The limit pulse producing circuit limits the maximum wipe range obtainable by moving the control lever, and the use of a fixed width pulse in conjunction with a variable width pulse reduces the percentage change required in the width of the variable width pulse that must be provided to generate a complete wipe.

A pair of digital comparators are utilized to compare the count in the lever counter with one or more counts indicating the horizontal and vertical position of the scanning beam. The horizontal position indicating counter is reset at the beginning of each scanning line and counts clock pulses until a maximum count of 255 is reached. The vertical position indicating count is reset at the beginning of each field and counts horizontal synchronizing pulses to provide a count indicative of the number of lines that have been scanned during each field. A noninterlaced system is utilized and a count capacity of 255 is utilized in the horizontal and vertical position indicating counters to provide equal resolution of beam position in the horizontal and vertical positions.

In order to eliminate the jitter in the display that can occur at the transition point between video signals, a digital quantizer is employed in conjunction with a latch in the lever counter circuit. The lever count from the lever counter is transferred to the latch for comparison with the horizontal and vertical counts only upon command from the digital quantizer. This prevents small variations in the lever count resulting from a setting of the lever between two digital count representative positions from causing jittering to occur in the visual display during the transition between the video signals. The digital quantizer contains an adder circuit that compares the instantaneous count from the lever counter with the count stored in the latch circuit, and provides a load signal to the latch circuit only when the difference between the count stored in the latch circuit and the instantaneous count in the lever counter exceeds a predetermined amount, indicative of a change in the lever position. When a small difference (on the order of approximately one bit) is sensed, the count currently stored in the latch is retained to prevent the small changes in count from causing a jittering of the video transition point.

Various effects are provided by variously combining the outputs of the horizontal and vertical comparators. A horizontal wipe is provided by disabling the vertical comparator and utilizing the results of the horizontal comparison to operate a pair of video switches for alternately applying first and second video signals to the transmission medium. A vertical wipe effect is generated by disabling the horizontal comparator and utilizing the output of the vertical comparator to control the video switches. The direction of the horizontal and vertical wipes may be reversed by reversing the counting sequence of the horizontal and vertical counters.

A corner wipe is obtained by utilizing the results of both of the horizontal and vertical comparisons to control the video switches. The initial position and direction of propagation of the corner wipe can be made to begin at any quadrant and proceed along any diagonal by reversing the counting sequence of either one or both of the horizontal and vertical counters.

A fixed QUAD effect is provided by disabling the lever counter and applying a 128-count signal to the horizontal and vertical comparators to provide four substantially equal size video images in the four quadrants of the composite image. A variable QUAD effect wherein the relative size of the four images may be controlled by the position of the control lever is provided by enabling the lever counter and utilizing the results of the horizontal and vertical comparisons to control four video switches to change the relative size of the four image portions.

Border control circuitry is utilized to control a border video switch that provides a preselected video pattern at its output between transitions in the video signal to generate a variable pattern border between the video images. The width of the vertical border is determined by a presettable counter counting clock pulses, and the width of the horizontal border is determined by a second presettable counter counting horizontal synchronization pulses. The counters count until overflow following a respective horizontal or vertical transition, and the border video switch is enabled during the time that the counters are counting. Presetting an initial count in each of the counters determines the length of time required for each counter to overflow and thereby adjusts the width of the borders.

The other objects and advantages of the present invention will be readily apparent from the following detailed description and drawings wherein:

FIG. 2 is a functional block diagram illustrating the operation of the video special effects generator according to the invention; and FIGS. 3–9 are detailed circuit diagrams of the special effects generator according to the invention drawn in digital logic form.

DETAILED DESCRIPTION OF THE INVENTION

Figure 1:
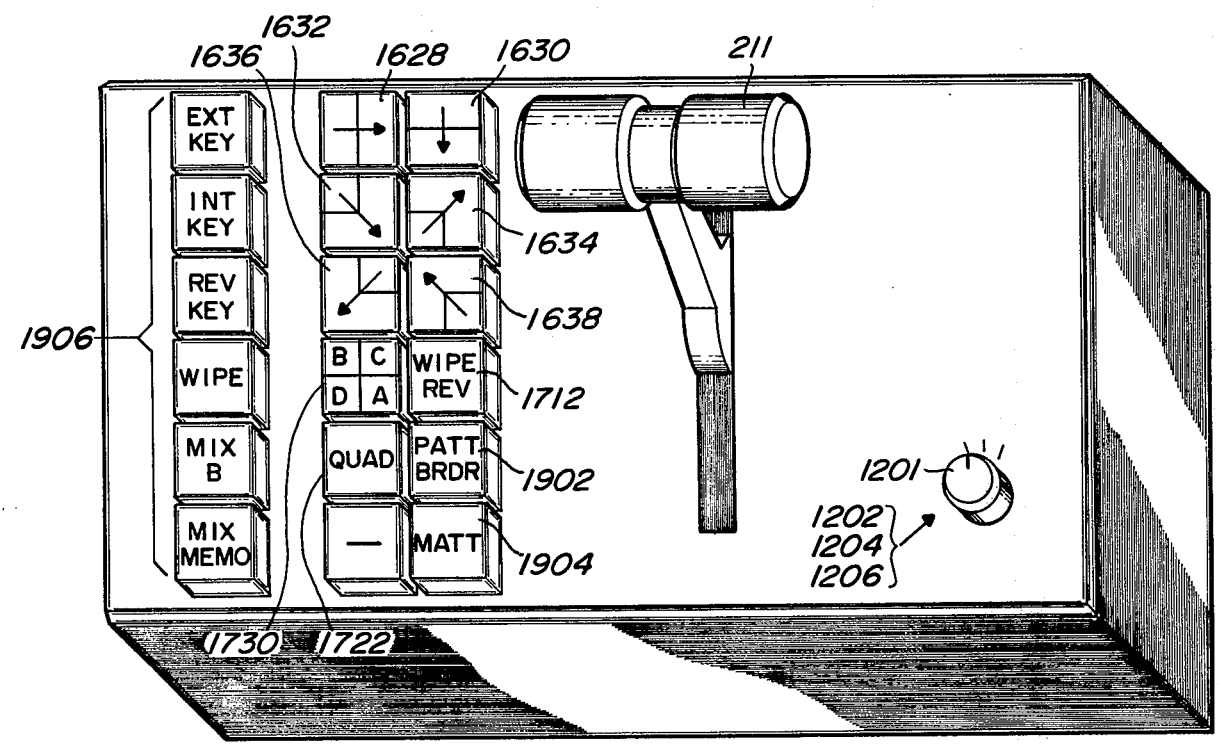
FIG. 1 is a perspective drawing of the control panel for the special effects generator according to the invention.
Figure 1A:
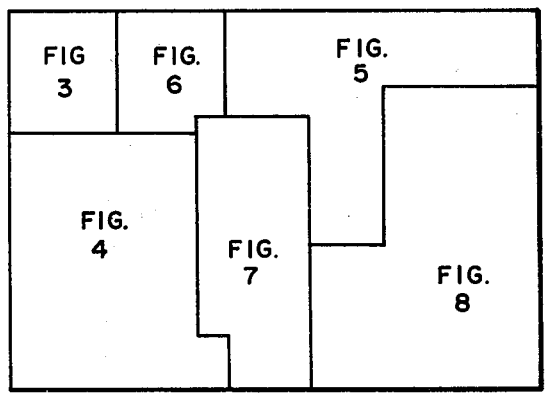
FIG. 1A illustrates the physical interrelationship between FIGS. 3–8.
Figure 3:
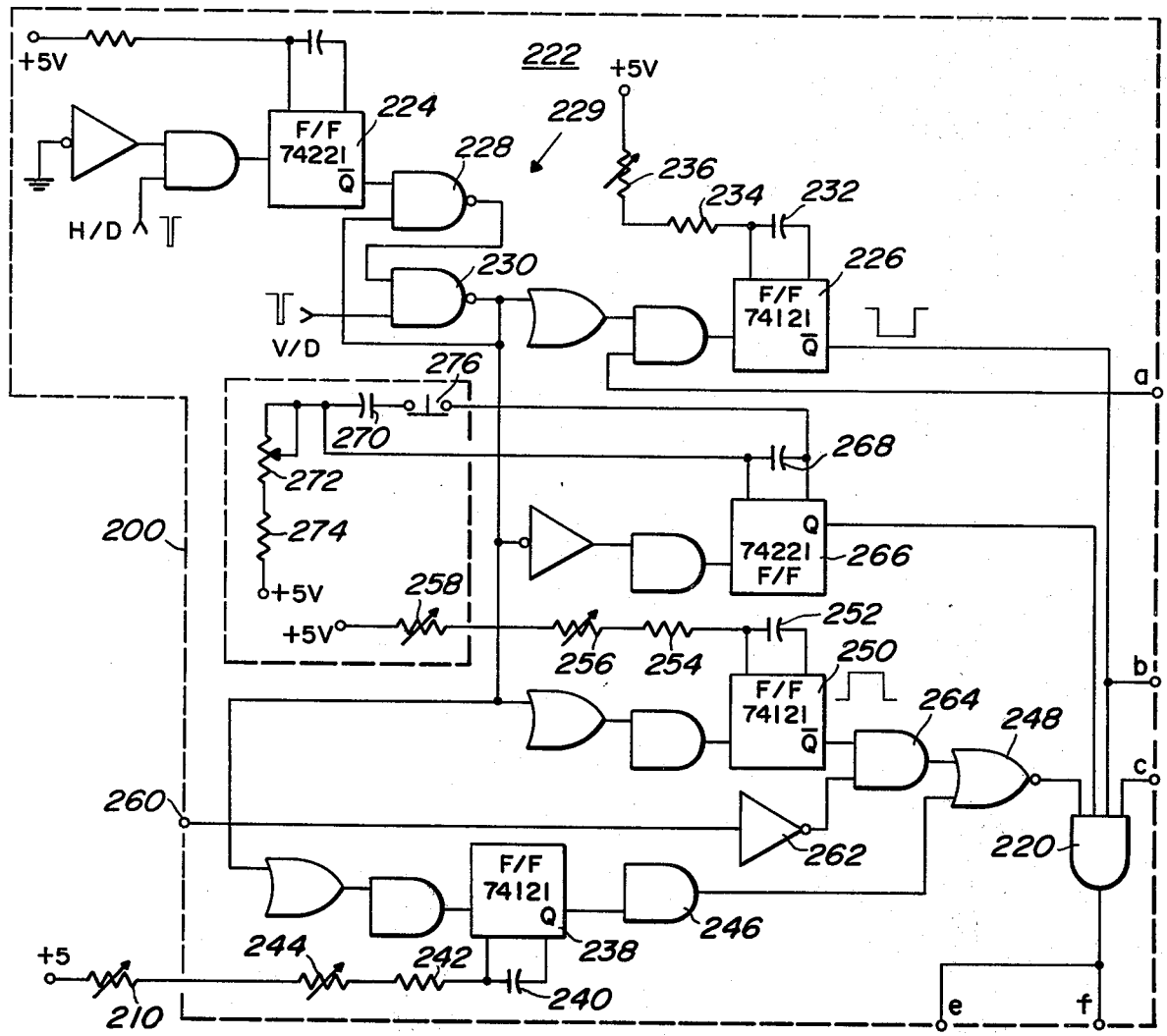
Figure 6:
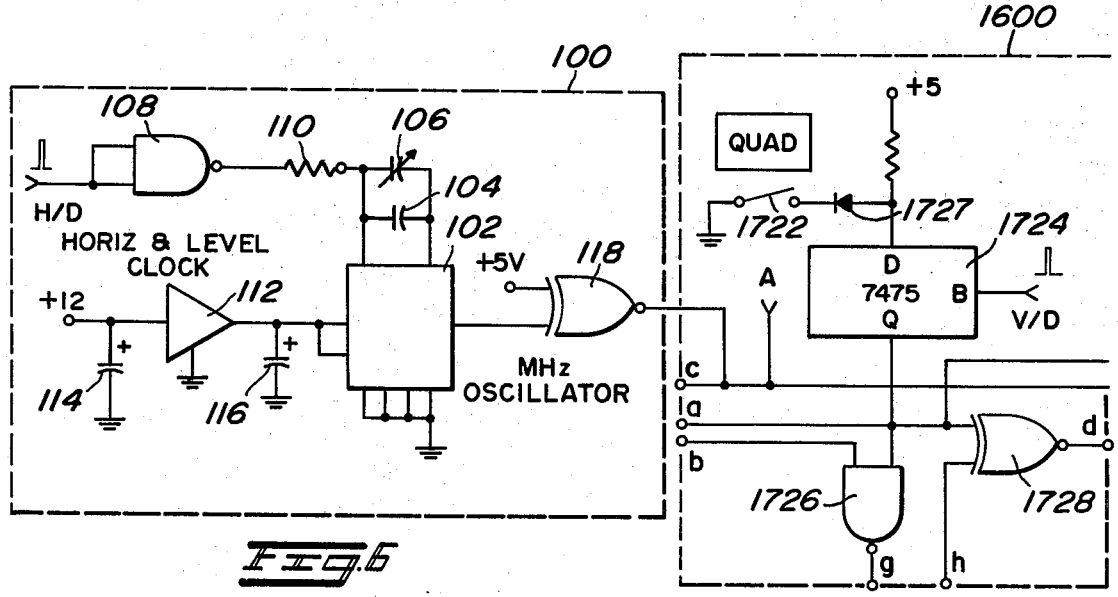
Figure 4:
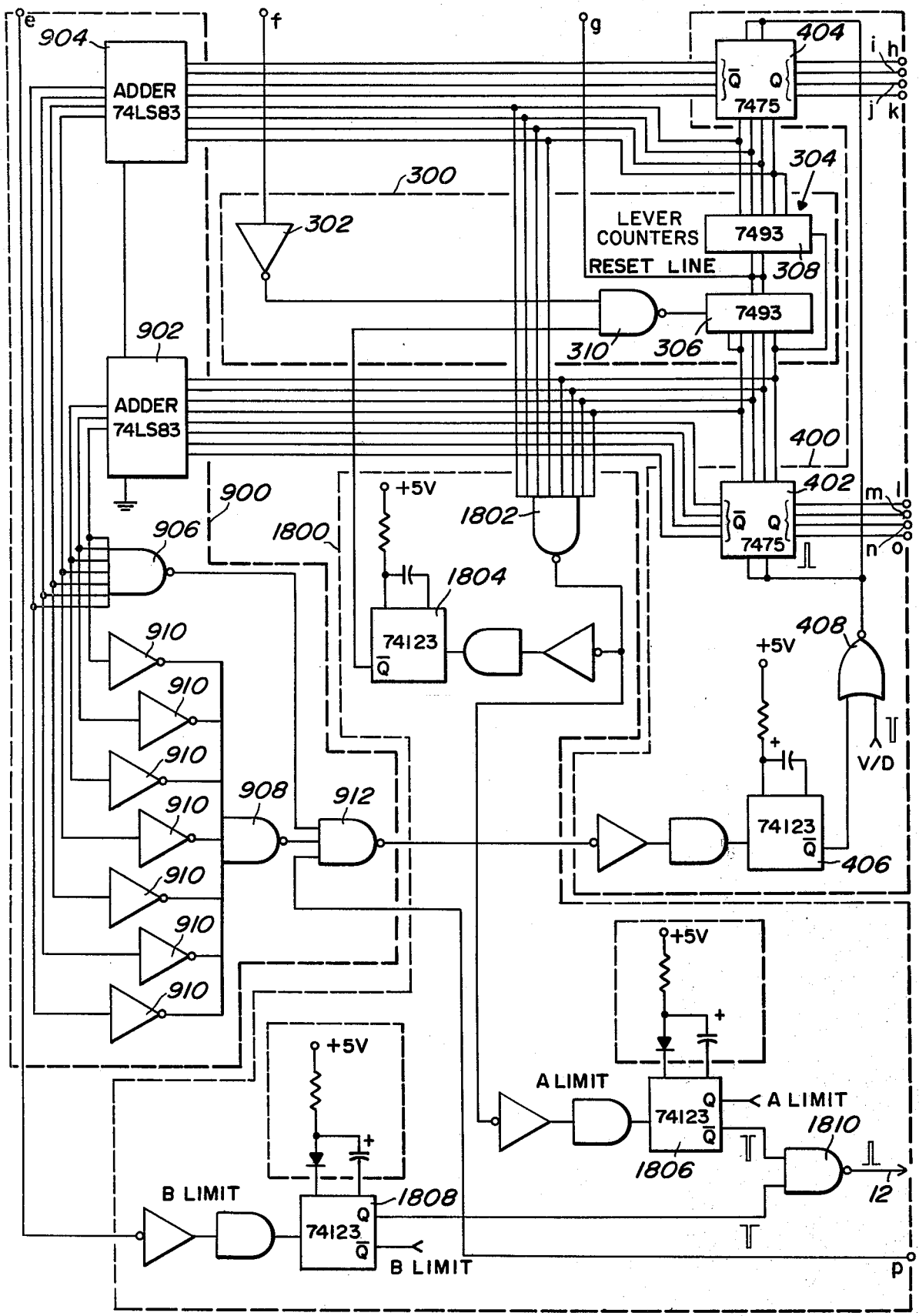
Figure 5:
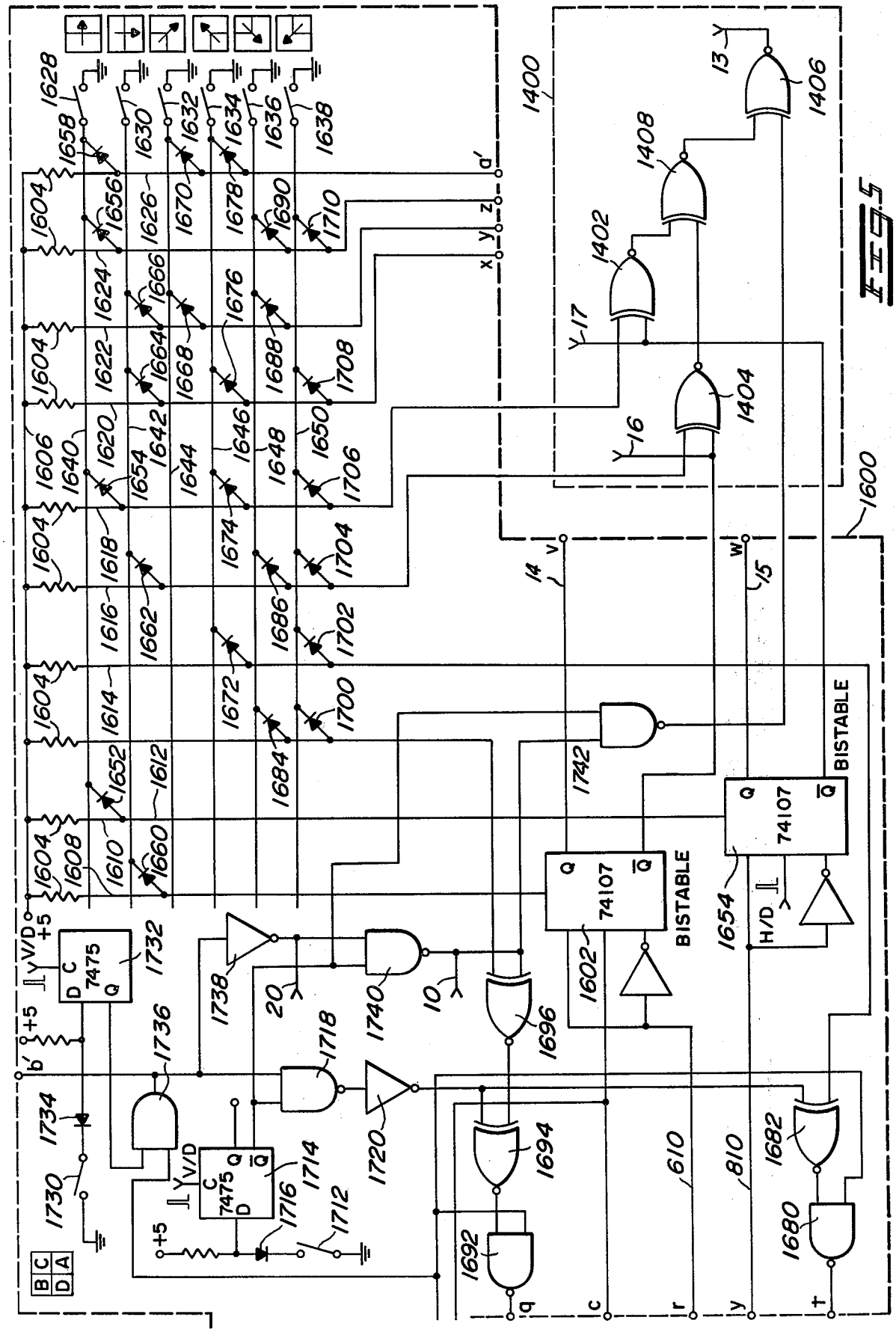

Referring now to FIG. 2 for an overview description of the special effects generator system according to the invention, there is shown a horizontal and lever clock 100 which synchronizes the operation of the system. Because the system shown in FIG. 2 is a noninterlaced type of system, and it is desired to maintain substantially equal resolution in the horizontal and vertical directions, the frequency of the clock 100 is selected to generate 255 pulses per horizontal line. This corresponds approximately one half of a standard 535 line scanning system and makes it convenient to utilize 8-bit counters and comparators to generate the special effects. If an interlace system is desired, as in the referenced U.S. Pat. No. 3,821,468, each horizontal line would be divided into segments substantially equal in number to the number of the scanning lines per field.

The pulses from the clock 100 are applied to a lever control system 200 which generates a digital signal proportional to the position of a control lever 211 (FIG. 1) mounted on a control panel and movable for creating the special effects. The control lever 211 drives a potentiometer 210 connected to the lever control circuit 200 and controls a timing circuit within the lever control circuit 200 which passes a predetermined number of pulses from the clock 100 to a lever counter 300 during each scanning line depending upon the position of the control lever 211. As a result, the position of the lever 211 is represented by a burst of digital pulses, the number of the pulses in the burst being representative of the position of the lever.

The lever counter 300 counts the number of pulses in each burst. The pulse burst count thus generated is periodically applied to a lever latch circuit 400 and stored for comparison with a horizontal or a vertical count signal.

The horizontal count signal is generated by a horizontal counter 500 that also counts the clock pulses from the clock 100. The horizontal counter 500 is reset to zero at the beginning of each scanning line and reaches a full count of 255 at the end of that scanning line. Consequently, the instantaneous count present in the counter 500 provides a digital indication of the instantaneous position of the scanning beam; a zero count indicating that the horizontal scan has just been initiated, a full count of 255 indicating that a scan has just been completed, and an intermediate count such as 128 indicating that the scanning beam is currently positioned horizontally near the center of the viewing screen.

The count in the lever latch circuit 400 is compared with the instantaneous count in the horizontal counter 500 by a horizontal comparator 600. The output of the horizontal counter 600 is a two-level signal indicating whether the count present in the lever latch circuit 400 is greater or less than the instantaneous count present in the horizontal counter 500. This signal is suitable for controlling a plurality of video switches 1900 to cause one of the switches 1900 to apply a first video signal to a transmission channel when the count in the lever latch circuit 400 is greater and a second video signal to the transmission channel when the count in the horizontal counter 500 is greater to provide a vertically split screen or horizontal wipe effect.

In a similar manner, a vertical count signal from a vertical counter 700 is compared with the count present in the lever latch circuit 400 by a vertical comparator 800 to provide a horizontally split screen or vertical wipe effect. The vertical counter 700 counts the horizontal synchronizing pulses associated with the video signal to provide a count representative of the number of the line being scanned to provide an indication of the vertical position of the scanning beam. The horizontal synchronizing pulses are applied to an input of the vertical counter labelled HORIZONTAL DRIVE. The horizontal synchronizing pulses may be recovered from the composite video signal by conventional synchronization recovery circuits, or they may be received directly from the horizontal synchronizing circuit that provides the horizontal synchronization for the video signal being transmitted. If necessary, pulse shaping circuitry may be utilized to alter the shape and polarity of the horizontal synchronizing pulses to make the pulses compatible with the operation of the vertical counter 700 and the rest of the special effects generator circuitry.

In accordance with an important feature of the present invention, a digital quantizer 900 is utilized to control the transfer of the count from the lever counter 300 to the lever latch circuit 400. Because the count from the lever counter 300 is a digital signal representative of the analog position of the lever, it can provide an accurate indication of the position of the lever only at discrete points. If the lever happens to be positioned between two of these discrete points, the lever counter 300 may provide pulse bursts of varying lengths, the first burst length being representative of one of the discrete points and the second burst length being representative of a second discrete point. If this variable burst length signal were applied to the lever latch circuit 400 directly and compared with the output of the counter 500 or 700, the resulting split screen image would have an undesirable jitter occurring at the transition point between images Consequently, the digital quantizer 900 is utilized to compare the current value of the count in the lever counter 300 with the value of the count stored in the lever latch circuit 400. If that difference is small, indicating that the lever has not moved, but rather that it is positioned between points represented by two different counts of the lever counter, the current count in the lever counter is not loaded into the lever latch. If the count difference exceeds a predetermined amount, indicating that the lever has moved, the current count in the counter 300 is loaded into the lever latch 400 for comparison with the horizontal or vertical count signals from the counters 500 and 700.

It is often desirable to provide a border between the images in a split screen display. When such a border is provided, it is desirable to be able to control the width of the border, and also to be able to change the color of the border. This is accomplished by a horizontal border counter 1000, a vertical border counter 1100, a border control circuit 1200 and a border gating circuit 1300. The horizontal border counter 1000 and the vertical border counter 1100 control the border gating circuit 1300 to cause a video signal having the desired color and pattern to be displayed during the transition between the display of different video signals. The border control circuit 1200 controls the length of time the border video signal is displayed and thereby controls the width of the borders.

The horizontal and vertical border counters 1000 and 1100 are digital border counters each utilizing counting circuitry that is activated by a transition in the output of the horizontal comparator 600 or the vertical comparator 800, respectively. For example, once the horizontal border counter 1000 is activated by a transition in the output of the horizontal comparator 600, indicating that the video has been switched, the horizontal border counter 1000 begins to count clock pulses from the clock 100. During the time that the horizontal border counter 1000 is counting, it provides a signal to the border gating circuit 1300 to cause the border video to be applied to the output channel. The horizontal border counter 1000 counts until a predetermined count, determined by the border control circuit 1200, is reached. At this point, the counting is terminated, the border video signal is inhibited by the border gating circuit 1300 and the second video signal is applied to the output channel. The border control circuit 1200 adjusts the width of the border by determining the number of pulses that must be applied to the horizontal border counter 1000 before the border video signal is inhibited.

The operation of the vertical border counter 1100 is similar, with the exception that horizontal drive pulses are counted rather than clock pulses. The horizontal border counter 1000 generates a vertical line between the video images and the vertical border counter generates a horizontal line between the video images, thereby permitting up to four images to be simultaneously displayed with a border being displayed between each of the images.

The outputs of the horizontal and vertical comparators 600 and 800 are applied to an A/B gating circuit 1400. The A/B gating circuit 1400 provides a high or a low signal to an output gating circuit 1500 depending on whether the first or the second video signal (video A or video B) has been selected by the horizontal and vertical comparators 600 and 800. In addition, the outputs of the comparators 600 and 800 and the output of the border gating circuit 1300 is applied to the output gating circuit 1500 to cause the output gating circuit 1500 to select one of four video signals (A, B, C or D) or the border signal to be applied to the output channel depending on the state of the outputs of the comparators 600 and 800 and the gating circuits 1300 and 1400. The actual video switching is accomplished by the five video switches 1900 (A, B, C and D video switches and a border switch).

Many different special effects are obtainable with the circuit according to the invention, including horizontal and vertical wipes, corner wipes in all quadrants and a QUAD display of four different video signals. The various effects are selected by an effects selector 1600. The effects selector 1600 includes a matrix circuit controlled by several effect selector push-button switches 1628, 1630, 1632, 1634, 1636 and 1638 (FIG. 1). Pushing a particular effects push button causes the matrix to enable various portions of the circuit to provide the desired effects. For example, if a horizontal wipe effect is desired, the effects selector disables the operation of the horizontal comparator and makes the appropriate adjustment to the border gating circuit 1300 and the A/B gating circuit 1400 to cause two video signals to be displayed side-by-side on the screen with the transition between the two video signals being controlled by the position of the control lever 211. Similarly, disabling the horizontal comparator 600 and enabling the vertical comparator 800 causes a vertical wipe effect wherein two video signals are displayed on the screen one above the other with the position of the transition being controlld by the position of the control lever 211. By reversing the polarity of the logic applied to the horizontal comparator 600 from the lever latch 400, the direction of the wipe can be reversed, i.e., the transition between the video signals can be made to proceed across the screen from right to left, rather than from left to right when the lever 211 is moved in a given direction. A similar polarity reversal to the vertical comparator 800 reverses the direction of the vertical wipe.

Allowing both the horizontal and vertical comparators 600 and 800 to operate simultaneously, causes a corner wipe effect wherein a first video signal is displayed in a corner of the screen and a second video signal is displayed in the remainder of the screen. Moving the lever 211 causes the area occupied by the first video signal to increase, proceeding from the corner and gradually increasing until the first video signal is displayed on the entire screen surface. By selectively applying reverse polarity signals to the horizontal comparator 600 and the vertical comparator 800 from the lever latch circuit 400 causes the first video signal selectively to be displayed in any one of the four corners of the screen.

If the horizontal comparator 600 and the vertical comparator 800 are both enabled, and the output gating function provided by the output gating circuit 1500 modified, a QUAD effect can be achieved. In such an effect, four different video signals may be simultaneously displayed, one in each corner of the screen. A fixed QUAD mode is provided wherein four equal size images are displayed, and a variable QUAD mode is provided to permit the relative sizes of the four images to be adjusted by the lever 211.

Finally, a limit gating circuit 1800 is coupled to the lever control circuit 200 and the lever counter 300 to determine whether the lever control circuit 200 is providing any pulses to the lever counter 300 and whether the lever counter 300 has a full count. The lever control circuit 200 providing no pulses indicating that a first video signal (video B) is fully occupying the screen and a full count in the lever counter 300 indicates that a second video signal (video A) is completely occupying the screen. These signals are denoted as B LIMIT and A LIMIT, respectively. The limit gating circuit 1800 provides an output signal if either of these conditions occurs.

FIG. 1 shows the layout of the control panel for controlling the operation of the special effects generator according to the invention. The control panel includes the effect selector push-button switches 1628, 1630, 1632, 1634, 1636 and 1638 which select the various wipe modes of operation. The control lever 211 that controls the lever control potentiometer 210 causes the wipe to proceed across the viewing screen in the direction indicated by the arrows on the buttons of the switches 1628, 1630, 1632, 1634, 1636 and 1638 when moved in one direction. Moving the lever in the opposite direction reverses the direction of the wipe. A wipe reverse switch 1712 reverses the direction of the wipe with respect to the direction of movement of the lever 211, and permits sequential wipes in the same direction by alternately depressing and disabling the wipe reverse switch 1712 and moving the lever 211 in the opposite directions.

A QUAD mode selector switch 1722 selects the QUAD mode, and depressing a variable QUAD mode switch 1730 provides a variable QUAD wipe pattern in which the image portion displayed in the upper left hand quadrant of the viewing screen (designated by the letter B) may be gradually enlarged with respect to the other three images by moving the control lever 211. As the size of the image B increases, its lower right hand corner proceeds diagonally across the viewing screen (similar to a corner wipe) until the image B occupies the entire viewing screen.

Figure 8:
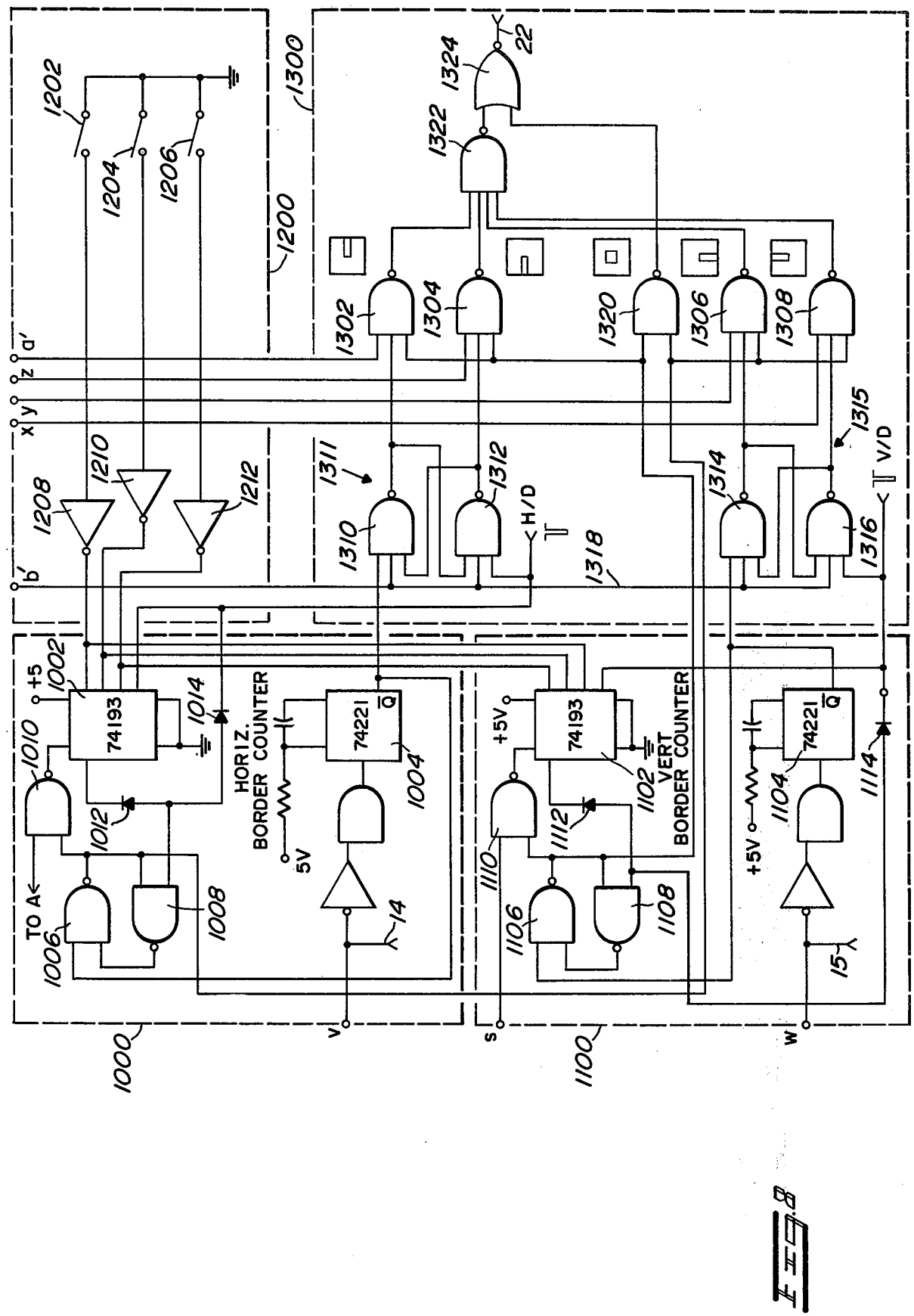
Figure 9:
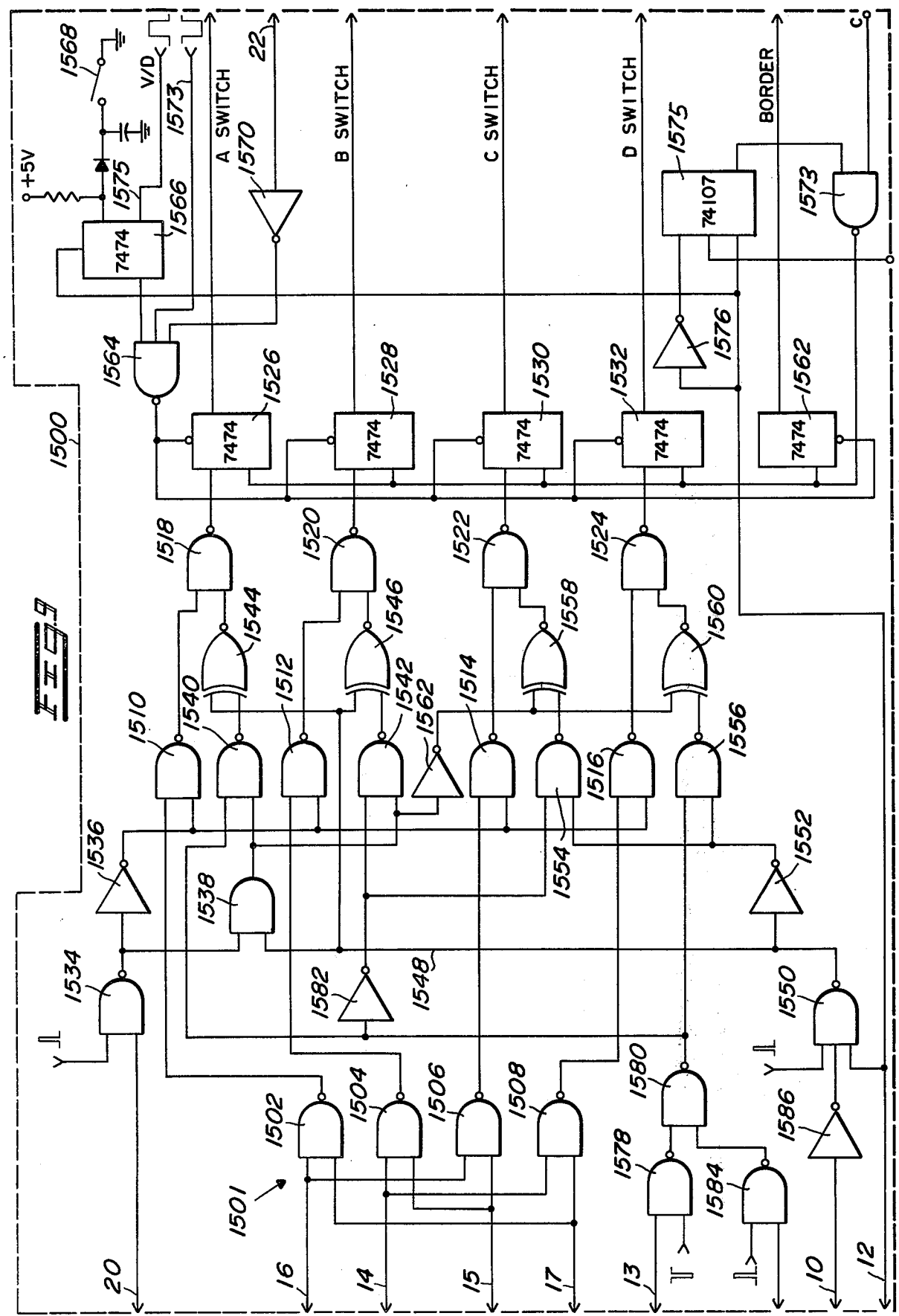

The width of the border is controlled by a knob 1201 which controls the operation of switches 1202, 1204 and 1206 (FIG. 8) to select the width of the border. The pattern displayed in the border is controlled by a pair of switches 1902 and 1904, the switch 1902 causing a pattern border to be displayed, and the switch 1904 causing a single color matte border to be displayed. The switches 1902 and 1904 selectively cause a video signal for generating either a pattern border or a matte border to be applied to the output channel during the border interval. A plurality of video signal mixing control switches 1906 are utilized to combine the output signal from the video switches 1900 with other video signals as necessary to provide the desired effect.

The circuit illustrated in FIG. 2 is shown in greater detail in FIGS. 3–9. In order to aid in the explanation of the circuitry shown in FIGS. 3–9, the circuitry has been arranged in groups of components with each group of components being functionally equivalent to a corresponding block in FIG. 2. Such groups have been enclosed by dashed lines and designated by the same reference numeral as designates the corresponding block in FIG. 2. It has been attempted to make the component groups of FIGS. 3–9 correspond to the blocks in FIG. 2 as closely as possible; however, because of practical considerations, interconnections not shown in FIG. 2 are necessary between groups. The interconnections between FIGS. 3–9 are alphanumerically designated, with the points on the various figures that are connected together being identified by the same reference character. In certain instances, it is difficlt to classify a component as belonging to one particular group because such a component may be performing more than one function. Such components have been arbitrarily assigned to one of the groups to aid in the description of the invention; however, other groupings are possible.

The oscillator 100 utilizes an integrated oscillator circuit 102 operating at a frequency of approximately 4 megahertz to provide the required 255 pulses per line for a 535 line noninterlaced system. In the embodiment shown, the oscillator circuit 102 includes an MC4024 integrated circuit oscillator manufactured by Motorola Inc. A fixed capacitor 104 and a variable capacitor 106 determine the frequency of the oscillator circuit 102, the capacitor 106 providing an adjustment for adjusting the frequency of the oscillator 102 to compensate for component and other variations. The output of the oscillator 102 must be synchronized with the horizontal line frequency to avoid drift and jitter. This is accomplished by a gate 108 connected as an inverting amplifier that receives horizontal synchronizing (horizontal drive) pulses and applies them to the oscillator circuit 102 via a resistor 110. A power supply comprising a voltage regulator 112 and a pair of filtering capacitors 114 and 116 supply a stabilized voltage to the oscillator 102. In this embodiment, the voltage regulator 112 includes a Fairchild LM309K integrated circuit; however, other regulators may be used. An exclusive-OR gate 118 serves as an output stage for applying the oscillator pulses to the rest of the circuitry.

In accordance with another important feature of the present invention, the lever control circuit 200 utilizes a 4-input NAND gate 220 for passing clock pulses from the clock 100 to the lever counter 300 when the gate 220 is enabled. The clock pulses from the clock 100 are applied to one input of the NAND gate 220 and are passed by that gate when a high active state signal is applied to the other three inputs of the gate. The three input signals to the three other inputs of the gate 220 include a fixed duration pulse, a variable duration pulse and a limit pulse. The fixed duration pulse is generated by a fixed width circuit 222 comprising a pair of monostable multivibrators 224 and 226 and a latch 229 formed by a pair of NAND gates 228 and 230. The monostable multivibrator 224 provides a positive going pulse at its $\overline{Q}$ output each time a negative going horizontal drive pulse is applied to its input. A vertical drive pulse (similar to a horizontal drive pulse except that it occurs at the beginning of each field rather than at the beginning of each line) is applied to the gate 230 while the $\overline{Q}$ output of the multivibrator 224 is applied to an input of the gate 228. The gates 228 and 230 are interconnected so that the presence of both the horizontal and vertical drive pulses is necessary to cause the latch 22a (output of the gate 230) to change state. When this occurs, a positive pulse is applied to the multivibrator 226 to cause the $\overline{Q}$ output of the multivibrator 226 to go to a low active state for a period of time determined by the values of a capacitor 232, a resistor 234 and a potentiometer 236. As a result, a fixed duration low state pulse is generated at the beginning of each scanning line when both the horizontal and vertical drive pulses are present.

The variable width pulse is generated by a monostable multivibrator 238 similar to the multivibrator 226. The multivibrator 238 is triggered by the output pulse from the gate 230 at the same time that the multivibrator 226 is triggered. The duration of the output pulse from the multivibrator 238 is determined by a capacitor 240, a resistor 242 a potentiometer 244 and the lever controlled potentiometer 210. Consequently, the width of the output pulse from the multivibrator 238 is dependent on the position of the lever 211. The potentiometer 244 provides a vernier adjustment of the pulse width, as does the potentiometer 236 in the fixed width pulse circuit 222. Typically, the lever controlled control potentiometer 210 varies the width of the pulse over a two-to-one range, ranging from a width substantially equal to the width of the fixed width pulse to a width approximately twice as wide as the fixed pulse. Such a two-to-one pulse width variation is sufficient to move the video transistion across the entire viewing screen. The fixed width pulse typically has a duration substantially equal to the time interval between horizontal drive pulses.

The $\overline{Q}$ output of the multivibrator 238 is then applied to the gate 220 via an AND gate 246 and a NOR gate 220 which are controlled by a second variable width pulse circuit. The second variable width pulse circuit comprises a monostable multivibrator 250 similar to the monostable multivibrator 238. The multivibrator 250 is also triggered by the output pulse from the gate 230 and provides an output pulse having a duration determined by the values of a capacitor 252, a resistor 254, a vernier potentiometer 256 and a potentiometer 258 similar to the lever potentiometer 210 and located on an auxilliary control panel (not shown). The multivibrator 250 serves as a preselected wipe circuit usable instead of the lever controlled wipe circuit comprising the multivibrator 238 and associated circuitry. The selection of the wipe circuit that controls the gate 220 is determined by the state of the signal applied to an input point 260. If a high state signal is applied to the input point 260, the gate 246 is enabled to permit the multivibrator 238 to control the gate 220. If a low state signal is applied to the input point 260, the gate 246 is disabled and the low state signal is inverted by an inverting amplifier 262 to provide a high state signal to a gate 264 to enable the gate 264 to pass the output of the multivibrator 250 to the gate 220. Consequently, the width of the variable pulse applied to the gate 220 may be determined by the value of either the lever controlled potentiometer 210 or the preset potentiometer 258, depending on the state of the signal applied to the input point 260.

The limit pulse is generated by a monostable multivibrator 266 which is also triggered by the output pulse from the gate 230. The width of the limit pulse is determined by the values of a pair of capacitors 268 and 270, a limit potentiometer 272 and a resistor 274. The limit pulse provided by the multivibrator 266 serves to enable the gate 220 when the limit pulse is in its high state. Because the gate 200 requires a high state signal at each of its inputs in order to pass clock pulses, the width of the high state pulse from the multivibrator 266 limits the maximum number of clock pulses that can be passed by the gate 220 to a number corresponding to the width of the pulse from the multivibrator 266, regardless of the duration of the pulses from either of the multivibrators 238 and 250. A defeat switch 276 disables the operation of the multivibrator 266 when a limit is not desired.

Operation of the lever control circuit is as follows. At the beginning of each scanning line when the horizontal and vertical drive pulses coincide, the multivibrator 226 applies a low active state signal to one of the inputs of the gate 220. This disables the gate 220 for a period of time equal to the time duration of the fixed pulse which has a duration approximately equal to the interval between horizontal drive pulses. Simultaneously, the multivibrators 238 and 250 are triggered, and the $\overline{Q}$ output pulse from one of the multivibrators 238 and 250 is inverted by the gate 248 and applied as a positive active state pulse to one of the inputs of the gate 220. If the width of the variable pulse is wider than that of the fixed pulse, and if the output of the multivibrator 266 is in its high state, the gate 220 will pass clock pulses from the clock circuit 100 for a period of time beginning with the termination of the fixed width pulse and ending with the termination of the variable pulse. Because the width of the variable pulse can be extended to twice the width of the fixed width pulse, and because 255 clock pulses occur between each horizontal drive pulse, up to 255 pulses can be passed by the gate 220. If the variable width pulse is reduced to the width of the fixed pulse, both pulses terminate simultaneously, and no clock pulses are passed. As a result, a two-to-one variation in the width of the variable pulse permits from zero to 255 clock pulses to be passed.

The maximum number of pulses that can be passed is limited by the multivibrator 266. As previously described, as long as the width of the high active state pulse from the multivibrator 266 equals or exceeds the width of the variable pulse, the number of pulses passed by the gate 220 is controlled by the width of the variable pulse. However, if the output from the multivibrator 266 goes to its low state prior to the termination of the variable width pulse, the gate will be disabled by the limit pulse, and the maximum number of pulses will be determined by the width of the limit pulse, regardless of the length of the variable pulse. As a result, the range of control of the lever 211 is limited by the multivibrator 266.

The output pulses from the gate 220 are inverted by an inverting amplifier 302 within the lever counter circuit 300 and applied to an 8-bit counter 304 fabricated from two 4-bit counters 306 and 308 connected in cascade. The count in the counter 304 is representative of the position of the lever 211. The counters 306 and 308 have their outputs connected to a pair of latches 402 and 404 that store the contents of the respective counters 306 and 308 upon receipt of an appropriate load signal.

The clock pulses from the clock 100 are also applied to the horizontal counter 500 which comprises an 8-bit counter formed from two 4-bit counters 502 and 504 similar to the counters 306 and 308. The counters 502 and 504 are reset at the beginning of each line by a horizontal drive pulse applied to a reset line 506 and reach their full count of 255 at the end of that line. Consequently, the instantaneous count in the counters 502 and 504 is representative of the position of the scanning beam on any given line.

The outputs of the horizontal counters 502 and 504 are applied to a pair of digital comparators 602 and 604 connected as an 8-bit comparator. The outputs of the latches 402 and 404 are also connected to the comparators 602 and 604 via eight exclusive NOR gates 606. The exclusive NOR gates 606 serve as polarity inverters for inverting the polarity of the count from the latches 402 and 404 when a low active state signal is applied to the exclusive NOR gates 606 via a line 608. When a high state signal is applied to the line 608, the exclusive NOR gates do not invert, but pass the count from the latches 402 and 404 to the comparators 602 and 604 without a polarity reversal.

The comparators 602 and 604 compare the values of the counts from the latch circuit 400 and the horizontal counters 500 and provide a first state output signal to a line 610 when the value of the count in the latch circuit 400 exceeds the value of the count in the counter 500. A second state signal is provided when the count in the counter 500 exceeds the count stored in the latch 400. This change of state is used to control one of the video switches 1900 and causes a first or second video signal to be applied to the output channel, with the transition between the first and second video signals being dependent upon the position of the lever 211.

The transition point between the first and second video signals can be moved across the viewing screen by changing the position of the lever 211. With the exclusive OR gates 606 operating in noninverting mode, as the lever 211 is moved in a direction that increases the count stored in the latch 400, the transition point moves horizontally across the screen proceeding from the left side of the screen to the right side when conventional scanning is used. If the exclusive NOR gates 606 are operating in an inverting mode, the transition point proceeds in the opposite direction, beginning at the right edge of the screen and proceeding toward the left as the count in the latch 400 increases. Consequently, the exclusive NOR gates 606 provide a method of electronically reversing the direction of travel of the video transition to enable the wipe to proceed in either direction.

The count in the latch 400 is also applied to a pair of counters 802 and 804 within the vertical comparator circuit 800 by means of eight exclusive NOR gates 806. The comparators 802 and 804 compare the contents of the latch 400 with the contents of the vertical counter 700 which comprises a pair of 4-bit counters 702 and 704 similar to counters 502 and 504. The counters 702 and 704 are reset at a field rate by the vertical drive signal applied to a reset line 706. Between resets, the counters 702 and 704 count the horizontal drive pulses that occur at the beginning of each of the scanning lines. Consequently, since there are approximately 255 scanning lines per active part of the field, the counters 702 and 704 reach a full count at the end of each field, with each of the intermediate counts being representative of a single line in the field.

The instantaneous count from the vertical counter 700 is compared with the count stored in the latch circuit 400 by the comparators 802 and 804, whose operation is similar to the comparators 602 and 604 previously described. Polarity reversal of the exclusive NOR gates 806 is achieved by applying a low active state signal to a line 808. A high active state signal applied to the line 808 causes the latch signal to be passed to the counters 802 and 804 uninverted. The output of the comparator 804 is applied to an output line 810 to provide an indication of whether the count stored in the latch circuit 400 exceeds or is less than the instantaneous count in the vertical counter 400. Changing the count stored in the latch circuit 400 causes the transition between the video signals to occur at different vertical points on the screen and a vertical wipe reversal can be achieved by changing the state of the signal applied to the line 808.

In accordance with an important aspect of the invention, the lever latch circuit 400 is controlled by the digital quantizer circuit 900 to permit new information to be loaded into the latches 402 and 404 only when a significant change has occured in the value of the lever count. This prevents jittering and other undesirable effects caused by small changes in the count that occur at some settings of the control lever 211. The digital quantizer 900 comprises a pair of 4-bit binary full adders 902 and 904 connected as an 8-bit full adder. Various integrated circuits are usable as the full adders 902 and 904; however, in the present invention, type 74LS83 full adders manufactured by Texas Instruments are used. The full adder 902 adds the output of the lever counter 306 and the $\overline{Q}$ output of the latch 402. The counter 904 adds the output of the lever counter 308 and the $\overline{Q}$ output of the latch 404. Because the outputs of the comparators 306 and 308 and the $\overline{Q}$ outputs of the latches 402 and 404 have opposite polarity logic. The outputs of the adders 902 and 904 will be either all zeros or all ones if the outputs of the counters have the same value as the count stored in the latches.

The output signals from the counters 902 and 904 are applied to a 7-input NAND gate 906. They are also applied to a 7-input NAND gate 908 after being inverted by seven inverting amplifiers 910 prior. Because one count changes in the output of the lever counters 306 and 308 are to be ignored, the least significant bit output signal from the adder 902 is not applied to the gates 906 and 908. Consequently, only the seven most significant bits from the adders 902 and 904 are examined by the gates 906 and 908 to determine whether they are all ones or all zeros.

The output of the NAND gate 906 is normally low when the signals applied to its inputs are all ones. If any one of the input signals goes to zero, the output of the NAND gate 906 will go high. Hence, for a new count increase or decrease of more than two bits (a change in the second least significant bit from the adder 902), the output of the gate 906 will go high. The output of the NAND gate 908 will be low when all of the outputs from the adders 902 and 904 are zero. When the new count increases by at least three bits, the output of the NAND gate 904 will go high. The outputs of the NAND gates 906 and 908 are applied to a NAND gate 912 to enable the gates 906 and 908 when the count increases by at least three bits or decreases by at least two bits. The high state signals permit the present count of the lever counters 306 and 308 to be transferred into the latches 402 and 404 when a one is applied to the third input of the gate 912 at the end of each field when the counters 702 and 704 in the vertical counter 700 reach a full count.

The three ones applied to the NAND gate 912 cause the output of the gate 912 to go low to trigger a monostable multivibrator 406. The monostable multivibrator 406 applies a low active state output signal to a NOR gate 408 when triggered. The low active state signal from the multivibrator 406 enables the NOR gate 408 to permit the NOR gate 408 to apply a positive pulse to the latches 402 and 404 upon receipt of the next low active state vertical drive pulse at the other input of the gate 408. The positive pulse from the gate 408 loads the count present in the counters 306 and 308 into the latches 402 and 404. If there has not been a sufficient change in the count to trigger the multivibrator 406, the high state output from the multivibrator 406 maintains the output of the gate 408 low, thereby rendering the output of the gate 406 nonresponsive to vertical drive pulses. Hence, the count stored in the latches 402 and 404 is changed at the end of each field only if a sufficient change in the lever count has occurred.

In accordance with another important aspect of the present invention, the horizontal and vertical border counters 1000 and 1100 serve as timing circuits for activating a gating circuit for passing border video signals for a predetermined time following each horizontal or vertical transition. The horizontal border counter 1000 utilizes a presettable 4-bit counter 1002 as the counting element. A suitable 4-bit counter usable as the counter 1002 is a Texas Instruments type 74193 presettable counter. The counter is enabled by a monostable multivibrator 1004 that provides an enabling pulse to a NAND gate 1006 in response to a transition signal from the comparator 604 which is applied to the multivibrator 1004 via a bistable multivibrator 1602. The gate 1006 forms a latch circuit in conjunction with a second NAND gate 1008, and the pulse from the monostable multivibrator 1004 causes the latch to toggle and to provide a high level enabling signal to a NAND gate 1010. The other input of the NAND gate 1010 is connected to the output of the gate 118 in the clock circuit 100.

The enabling of the gate 1010 permits clock pulses to be counted by the counter 1002 until a full count is reached. When the full count is reached, a low active state signal is applied to the cathode of a diode 1012. The low active state signal again toggles the latch and disables the gate 101, thereby terminating the count. The length of time that the counter 1002 counts is determined by the border control circuit 1200. The border control circuit 1200 includes three border width selector switches 1202, 1204 and 1206 each connected to one of three inverting amplifiers 1208, 1210 and 1212. The outputs of the inverting amplifiers 1208, 1210 and 1212 are connected to three preset inputs of the counter 1002. The counter 1212 presets the most significant bit stage, the counter 1212 presets the next most significant bit stage and the counter 1212 presets the third most significant bit stage. Consequently, when the switch 1202 is closed, a high level signal is applied to the counter 1002 to thereby fill its most significant bit stage. As a result, only three least significant bit stages can be filled by counting pulses from the clock circuit 100, and the counter 1002 overflows in a relatively short time, thereby resulting in a narrow width border. Closing the switch 1204 loads a one into an intermediate stage in the counter 1002 to provide a medium width border, and closing the switch 1206 loads a one into a less significant stage of the counter 1002 to provide a wide border.

The output signal from the horizontal border counter 1000 is obtained from the output of the gate 1006. A high level output signal indicates that the counter 1002 is counting and renders the border gating circuit 1300 operative to apply the border video to the output channel. A low level output from the gate 1006 indicates that the count has been completed and disables the border gating circuit 1300.

The construction of the vertical border counter is similar to that of the horizontal border counter 1000. The vertical border counter 1100 comprises a vertical counter circuit 1102, a monostable multivibrator 1104, a pair of NAND gates 1106 and 1108 and a diode 1112. The operation of the vertical border counter circuit 1100 is the same as that of the horizontal border counter circuit 1000 with the exception that horizontal drive pulses (rather than clock pulses) are applied to the counter 1102 via a NAND gate 1110. The counter 1102 is presettable by the border control circuit 1200 and counts horizontal drive pulses until overflow occurs. As a result, the border control circuit 1200 determines the number of scanning lines comprising the horizontal borders. The output signal from the vertical border counter 1100 is taken from the output of the gate 1106 and applied to the border gating circuit 1300.

The horizontal and vertical border counter circuits 1000 and 1100 are synchronized with the horizontal and vertical drive pulses, respectively. The vertical drive pulses are applied to the vertical border counter 1100 through a diode 1114, and the horizontal drive pulses are applied to the horizontal border counter 1000 through a diode 1014. The function of the horizontal and vertical drive pulses is to reset the respective counters at the end of each line or field.

The effect selector 1600 contains a diode switching matrix for selectively connecting various ones of the comparators to the gating circuits 1300, 1400 and 1500, and for modifying the operation of the gating circuits 1300, 1400 and 1500 to provide the video switching function necessary to achieve the desired effect. The switching matrix comprising a plurality of resistors 1604 each coupled to a common line 1606 carrying a positive potential corresponding to a high state logic level. Each of the resistors 1604 is connected to one of a plurality of control lines 1608, 1610, 1612, 1614, 1616, 1618, 1620, 1622, 1624 and 1626, and applies the high logic level potential from the line 1606 to one of the control lines. The effect selector push-button switches 1628, 1630, 1632, 1634, 1636 and 1638 each have one terminal connected to ground and the other terminal connected to one of a plurality of switching lines 1640, 1642, 1644, 1646, 1648 and 1650. The control lines and the switching lines are interconnected by a plurality of diodes which bring the potential of preselected ones of the control lines to a low state logic level (ground) when one of the effect selector switches is closed. For example, closing the switch 1628 forward biases a diode 1652 interconnecting the switching line 1640 and the control line 1610 to apply a low state logic level to a bistable 1654. The low level signal disables the bistable 1654 to prevent the application of the output signal from the vertical comparator 800 to the A/B gating circuit 1400 and the border gating circuit 1300. As a result, only the horizontal comparator 600 controls the selection of the video signal and a horizontal wipe as illustrated in the figure adjacent the switch 1628 results. The closing of the switch 1628 also forward biases the diodes 1654, 1656 and 1658 and results in a low level signal being applied to an exclusive NOR gate 1402 to reverse the polarity of the switching waveform from the circuit 1400 and to a pair of NAND gates 1302 and 1304 in the border switching circuit 1300 to disable the border video switching circuit during vertical transitions, thereby eliminating the horizontal border and permitting only a vertical border at the video transition.

Similarly, closing the switch 1630 forward biases diodes 1660 and 1662 to disable the bistable 1602 and invert the polarity of the output of an exclusive NOR gate 1404. Simultaneously, two NAND gates 1306 and 1308 in the border gating circuit 1300 are disabled to permit only a horizontal border line to occur between vertical transitions to video.

A corner wipe is achieved by closing the switch 1602 to forward bias a pair of diodes 1668 and 1670 to apply a low level potential to the lines 1622 and 1626. This allows both the horizontal and vertical comparators to control the gating circuits 1300 and 1400 and results in a corner wipe as illustrated in the drawing adjacent to the switch 1632. The closing of the switch 1632 also applies a low level potential to the inputs of the gates 1302 and 1306 to disable the border video for the lower portion of the vertical scan and the right hand portion of the horizontal scan to provide a border only around the edge of the corner video. Moving the control lever 211 causes the corner wipe to proceed across the screen diagonally from the upper left hand corner to the lower right hand corner.

Closing the switch 1634 forward biases diodes 1672, 1674, 1676 and 1678 to lower the potentials on the control lines 1614, 1618, 1620 and 1626. This reverses the polarity of the output of the gates 1402 and applies a polarity reversing signal to the gates 806 via a pair of gates 1680 and 1682. The polarity reversing signal reverses the polarity of the latch output signal applied to the comparators 802 and 804 to reverse the direction of movement of the vertical component of the wipe to provide a corner wipe proceeding from the lower left hand corner to the upper right hand corner. The polarity reversal of the output of the gate 1402 adjusts the polarity at the output of the gate 1406 to make the operation of the A/B gating circuit 1400 consistent with the inverted pattern, i.e., to cause the corner video signal to be displayed in the lower left hand corner rather than the upper left hand corner. The diodes 1676 and 1678 disable the border video signal during the upper portion of the vertical border and the right hand portion of the horizontal border.

Closing the switch 1636 forward biases a pair of diodes 1684 and 1686 to lower the potential of the lines 1612 and 1616. Lowering the potential of the lines 1612 causes a low level potential to be applied to the polarity reversing gates 606 via three gates 1692, 1694 and 1696 to reverse the direction of the horizontal component of the wipe. The low level signal on the line 1616 inverts the polarity of the output of the gate 1404 and the low level signal on the lines 1622 and 1624 suppresses the lower portion of the vertical border and the left hand portion of the horizontal border to provide a corner wipe proceeding from the upper right hand corner to the lower left hand corner.

Closing the switch 1638 forward biases diodes 1700, 1702, 1704, 1708 and 1710. This reverses the polarity of the outputs of the gates 606 and 806, applies a low level signal to the lines 1616 and 1618 to reverse the polarity of the output of the gates 1402 and 1404, and applies a low level signal to the lines 1620 and 1624 to suppress the upper portion of the vertical border and the left hand portion of the horizontal border to provide a corner wipe beginning in the lower right hand corner and proceeding to the upper left hand corner.

The direction of movement of the wipe that has been selected by one of the switches 1628, 1630, 1632, 1634, 1636 and 1638 may be reversed by closing a switch 1712. The closing of the switch 1712 applies a low level signal to the D input of a bistable multivibrator 1714 by grounding the D input through a diode 1716. This causes the $\overline{Q}$ output of the bistable multivibrator 1714 to go high following the next vertical drive pulse applied to the clock input of the multivibrator 1714. The high output pulse is then twice inverted by a NAND gate 1718 and an inverting amplifier 1720 and applied to the exclusive NOR gates 1682 and 1694 to reverse the polarity of the output of the horizontal and vertical polarity reversing gates 606 and 806.

The QUAD mode, where four pictures are simultaneously displayed in four separate quadrants of the viewing screen is selected by closing a switch 1722 to thereby apply a low level signal to the D input of a bistable multivibrator 1724 by grounding the cathode of a diode 1727. This results in a low level output signal being produced at the Q output of the multivibrator 1724 following the receipt of the next vertical drive pulse at the clock input thereof. The low level output signal disables a gate 1726 and prevents the lever counters 306 and 308 from being reset by the output of the monostable multivibrator 226. The low level Q output signal from the multivibrator 1724 is also applied to an exclusive NOR gate 1728. This causes the exclusive NOR gate 1728 to apply a high level signal to the most significant bit input of the counters 604 and 804 and results in a 128 count being applied to the horizontal and vertical comparators. The 128 count (approximately one half of 255) causes the horizontal comparator to change state at the center of each scanning line, and the vertical comparator to change state at the center of each field. The outputs of the horizontal and vertical comparators are applied to the bistables 1602 and 1654 to toggle the multivibrators 1602 and 1654 once at the center of each line and once at the center of each field, respectively. The $\overline{Q}$ outputs of the multivibrators 1602 and 1654 are applied to the A/B gating circuit 1400 and to a quardrant recognition circuit (to be described in a subsequent portion of this specification) in the output gating circuit 1500. The horizontal and vertical $\overline{Q}$ outputs from the multivibrators 1602 and 1654, together with the output of the A/B gating circuit 1400, provide sufficient information to the output gating circuit 1500 to control four of the video switches 1900 so that four video signals are gated in the proper sequence to cause a different video image to be displayed in each of the four quadrants of the viewing screen.

When the QUAD mode is selected by the switch 1722, the sizes of the four displayed images are equal and not adjustable by movement of the lever 211. If a variable QUAD mode in which the relative sizes of the four images may be altered is desired, a variable QUAD mode switch 1730 should be closed instead of the switch 1722. Closing the switch 1730 generates the appropriate border and video switching signals to provide the QUAD pattern, and opening the switch 1722 removes the 128 count preset in the counters 604 and 804 makes the QUAD patern responsive to the position of the lever 211. This permits the size of the upper left hand image to be increased or decreased with respect to the size of the other three images in a manner similar to that obtained in a corner wipe.

Closing the switch 1730 applies a low level signal to the D input of a bistable multivibrator 1732 through a diode 1734. This causes the multivibrator 1732 to be toggled by the next vertical drive pulse applied to its clock input, and results in a low level signal being applied to one of the inputs of an AND gate 1736 connected to the Q output of the multivibrator 1732. The output of the gate 1736 goes low and disables the gate 1718 to thereby disable the normal control path for the wipe reverse switch 1712. An alternate control path for the wipe reverse switch 1712 is provided by a NAND gate 1740 which is enabled by the output of the gate 1736 after it has been reversed in polarity by an inverting amplifier 1738. The enabling of the NAND gate 1740 permits the $\overline{Q}$ output signal from the wipe reverse multivibrators 1714 to be applied to the gate 1796. As a result, only the direction of the horizontal wipe is reversed by the wipe lever 1712 when the wipe reverse switch is closed. This is different from the normal wipe reverse mode is which the direction of both the horizontal and vertical wipes is reversed in response to the closing of the wipe reverse switch 1712.

The output signal from the gate 1740 is also applied to a NAND gate 1742 together with the $\overline{Q}$ output of the multivibrator 1714. The output of the gate 1742 controls the A/B gating circuit 1400 so that the proper video signal is applied to each quadrant of the viewing screen in a manner similar to that in the QUAD mode. When both the switch 1730 and the wipe reverse switch 1712 are closed, a polarity reversing signal is applied to a gate 1406 in the A/B gating circuit 1400 via the gate 1740. As a result, the image disposed in the upper right hand corner of the viewing screen can be made to increase with respect to the size of the other three images when both the switches 1730 and 1712 are closed.

In order to provide a border separating the four images, the output of the gate 1736 is also applied to the gates 1310, 1312, 1314 and 1316 to disable the operation of the latches 1311 and 1315. The disabling of the latches 1311 and 1315 causes a high level output signal to be applied to all four of the gates 1302, 1304, 1306 and 1308, thereby causing the horizontal and vertical borders to extend across the entire screen, thereby separating the four images. The above described operation of the border gating circuitry is more fully explained in a subsequent portion of this specification.

The border gating circuitry 1300 contains three basic sections: one section for generating a horizontal border switching signal, a section for generating a vertical border switching signal and a section for generating a rectangular area for filling in the intersection of the horizontal and vertical borders. The horizontal border is generated by the circuitry including the latch 1311 and the gates 1302 and 1304. In the nonQUAD mode of operation, a high level signal is applied to the inputs of the gates 1310 and 1312 via a line 1318 to enable the latch 1311. The latch 1311 is toggled by the $\overline{Q}$ output of the one-shot 1004 each time the output of the horizontal comparator 604 changes state. The latch 1311 is reset at the beginning of each horizontal line by a low active state horizontal drive pulse applied to the gate 1312. The output signals from the gates 1310 and 1312 are complementary and are applied to inputs of the gates 1302 and 1304, respectively. The resetting of the latch 1311 by the horizontal drive pulse causes a high level signal initially to be applied to the gate 1304 and a low level signal to the gate 1302. This results in the gate 1304 being enabled and the gate 1302 being disabled at the initiation of each scanning line. Following the transition of the output signal from the comparator 604, the latch 1311 toggles to enable the gate 1302 for the remainder of the scanning line. The gates 1302 and 1304 are connected to the effect selector circuit 1600, and the gate 1302 is disabled by closing one of the effects selector switches when an effect not requiring a border during the portion of the horizontal scan following the transition of the comparator 604 is selected. Similarly, the gate 1304 is disabled when a horizontal border is not required during the initial portion of the scan.

The operation of the vertical border generating circuit is similar to that of the horizontal border generating circuit with the exception that the latch 1315 is toggled during the transition of the output signal from the vertical comparator 804 and reset by a low active state vertical drive pulse. The complementary outputs of the latch 1315 are applied to the gates 1306 and 1304 which are selectively enabled to provide a vertical border in the upper or lower portion of the viewing screen as desired.

When the effect selected requires both a horizontal and a vertical border, it is necessary to provide a rectangle at the intersection of the two borders to complete the border effect. The rectangle is provided by an AND gate 1320 that is enabled when both the horizontal and vertical border counters 1002 and 1102 are operating.

The outputs of the gates 1302, 1304, 1306 and 1308 are applied to a 4-input NAND gate 1322 which provides a high level output if any one of its inputs goes low. The output of the gate 1322 is applied to a NOR gate 1324 together with the output of the gate 1320. The NOR gate 1324 serves to combine the outputs of the gates 1320 and 1322 to provide a combined border switching signal that goes low if the output of either one of the gates 1320 or 1322 goes high. The output of the gate 1324 is applied to the output gating circuit 1500 to control the switching of the border video signal.

The operation of the border gating circuit 1300 when one of the QUAD modes has been selected is similar to its operation in the wipe mode with the exception that a low level signal is applied to the line 1318 to disable the latches 1311 and 1315 when the QUAD mode or variable QUAD mode is selected. This results in a high level output signal appearing at both outputs of each of the latches 1311 and 1315. The high outputs provide an enabling signal to the gates 1302, 1304, 1306 and 1308 during the entire horizontal and vertical scans, respectively. This permits a border extending across the entire horizontal and vertical scans to be generated for separating the four video signals.

The function of the A/B gating circuit 1400 is relatively straightforward. As previously described, the A/B gating circuit contains three exclusive NOR gates 1402, 1404 and 1406, operating in conjunction with a NOR gate 1408 to provide an A/B switching signal indicating whether a first or a second video signal (A or B video) is to be applied to the output channel. The polarity of the A/B switching signal is determined by the states of the outputs of the horizontal and vertical comparators, and may be inverted in accordance with the desired effect by applying the appropriate polarity switching signals to the gates 1402, 1404 and 1406. The circuit 1400 also provides horizontal $\overline{Q}$ and vertical $\overline{Q}$ signals, each indicating the state of the output of one of the comparators 604 and 804. Together, the horizontal and vertical $\overline{Q}$ signals and the A/B switching signal contain enough information to permit the output gating circuit 1500 to identify the quadrant being scanned and to activate the appropriate ones of the video switches 1900 necessary to generate the effect selected by the effect selector 1600. Video switches similar to those described in the referenced Busch patent may be used as the video switches 1900.

The limit gating circuit 1800 provides an output when a full count or a zero count is present in the lever counters. The limit gating circuit 1800 contains an 8-input NAND gate 1802 that is responsive to a full count in the lever counter 304 and generates a low level output signal when the full count is reached. The low level output signal from the gate 1802 triggers a monostable multivibrator 1804 which applies a low level output pulse to an AND gate 310 in the lever counter circuit 300 to prevent further clock pulses from being applied to the counter 304 after the full count has been reached. The output signal from the gate 1802 is also applied to a retriggerable A limit multivibrator 1806 which generates a positive level A limit output signal at its Q output.

The gate 220 applies clock pulses to a B limit retriggerable monostable multivibrator 1808. The multivibrator 1808 is maintained in a triggered state as long as pulses are received from the gate 220; however, if no pulses are received within an interval somewhat greater than a vertical field interval, the multivibrator 1808 returns to its rest state and provides a B limit signal at its $\overline{Q}$ output. A NAND gate 1810 is coupled to the Q output of the multivibrator 1808 and the $\overline{Q}$ output of the multivibrator 1806 to provide a high level signal if either the A or the B limit is reached.

The output gating circuit 1500 (FIG. 9) contains a QUAD mode switching signal decoder 1501 having four NAND gates 1502, 1504, 1506 and 1508. Inputs of the gates 1502 and 1504 are connected to the respective $\overline{Q}$ and Q outputs of the bistable multivibrator 1602 by means of a pair of leads 14 and 16 which are connected to correspondingly numbered leads in FIG. 5. Similarly, the gates 1506 and 1508 are connected to the respective Q and $\overline{Q}$ outputs of the bistable multivibrator 1654 via leads 15 and 17.

The gate 1502 serves as a channel A decoder for providing a low active state output signal when the horizontal $\overline{Q}$ and vertical Q inputs are high. The gate 1504 acts as a channel B decoder to provide a low active state output signal when the horizontal Q and vertical Q signals are high. Similarly, the gate 1506 provides a low output when the horizontal Q and the vertical $\overline{Q}$ outputs are high, and the gate 1508 provides a low output when the horizontal Q and the vertical Q outputs are high. Consequently each of the gates 1502, 1504, 1506 and 1508 provides a low level output signal when a different quadrant of the screen is being scanned. The output signals from the gates 1502, 1504, 1506 and 1508 are passed via NAND gates 1510, 1512, 1514, 1516, NAND gates 1518, 1520, 1522, 1524 and applied to four bistable multivibrators 1526, 1528, 1530 and 1532, respectively. Each of the four multivibrators 1526, 1528, 1530 and 1532 provides a low active state output signal at its Q output when the output of its corresponding gate 1502, 1504, 1506 and 1508 is low, and the NAND gates interposed therebetween are enabled.

The gates 1510, 1512, 1514 and 1516 are enabled when a high level signal is applied to a gate 1534 from the inverter 1738 via a line 20 and a blanking pulse is not present. This results in a low active state signal at the output of the gate 1534 which is inverted by an inverting amplifier 1536 and applied to the gates 1510, 1512, 1514 and 1516. The high level signal on the line 20 indicates that the system is operating in the QUAD mode. The low level output signal from the gate 1534 is used to disable an AND gate 1538 which provides a low level output signal to disable a pair of NAND gates 1540 and 1542. The gates 1540 and 1542 apply a high level output signal to a pair of exclusive NOR gates 1544 and 1546 which apply a high level enabling signal to the gates 1518 and 1520 provided that the potential on the line 1548 connected to the other inputs of the NOR gates 1544 and 1546 is also high. This is the normal case occurring when no A or B limit signal is generated and the output of a gate 1550 is high.

The high output of the gate 1550 is inverted by an inverting amplifier 1552 and applied to a pair of NAND gates 1554 and 1556 which apply a high output signal to a pair of respective NOR gates 1558 and 1560. The low level output signals from the NAND gate 1538 is inverted by an inverting amplifier 1562 and applied to the exclusive NOR gates 1558 and 1560 to cause the outputs of the gates 1558 and 1560 to provide a high enabling signal to the gates 1522 and 1524. As a result, all of the gates between the decoding gates 1502, 1504, 1506 and 1508 are enabled in the QUAD mode, and the outputs of the bistable multivibrators 1526, 1528, 1530 and 1532 reflect the quadrant being scanned and provides an output signal to an appropriate one of the video switches 1900 for applying the appropriate video signal to the output channel.

The border video switch output signal is provided by a border video bistable multivibrator 1562 that is controlled by a 3-input NAND gate 1564. The NAND gate 1564 is enabled by a bistable multivibrator 1566 when the border switch 1568 is closed. The border video switching signal from the border gating circuit 1300 is applied to an inverting amplifier 1570 via a line 22 and inverted by the amplifier 1570 to activate the gate 1564 when the switch 1568 is closed and the voltage level on the line 22 is low. Thus, the border video switching signal from the border gating circuit 1300 controls the multivibrator 1562 which controls the border video switch.

To provide for synchronization of the output gating circuit 1500, the gate 1564 is periodically disabled during the blanking intervals by low level blanking pulses applied to a line 1572. The bistable multivibrator 1566 is reset by low level vertical drive pulses applied to a line 1574. Synchronization for the output multivibrators 1526, 1528, 1530, 1532 and 1562 is provided by a NAND gate 1573 that strobes data into the output multivibrators at the clock rate. The second input of the NAND gate 1573 is connected to a bistable multivibrator 1575 that disables the NAND gate 1573 upon receipt of an A limit or a B limit signal from a line 12 (via an inverting amplifier 1576). The output of the amplifier 1576 also disables the border control multivibrator 1566 to terminate the generation of a pattern.

The wipe mode of operation is controlled by a pair of NAND gates 1578 and 1580 and an inverting amplifier 1582. One input of the NAND gate 1578 is connected to the A/B switching output of the A/B gating circuit 1400 (gate 1810, FIG. 4). The A/B output signal is passed by the gates 1578 and 1580 except when a blanking pulse is present or when a high A limit signal is applied to a gate 1584. The A/B switching signal is twice inverted by the gates 1578 and 1580 and applied to the gate 1540. The A/B signal is again inverted by the amplifier 1582 and applied to the gate 1542 to thereby provide complementary signals to the gates 1540 and 1542 for alternately operating the gates 1518 and 1520 (via the gates 1544 and 1546). The gates 1518 and 1520 alternately operate the multivibrators 1526 and 1528 to thereby alternately apply the channel A and channel B video signals to the output channel, with the B channel video signal being applied to the output channel when the output of the gate 1580 is high and the A channel signal being applied to the output channel when the output of the gate 1580 is low. The gates 1522 and 1524 are disabled in this mode by applying a high level signal to the gates 1554 and 1566 from the line 10 via the gate 1550, the inverting amplifier 1552 and a second inverting amplifier 1586.

The gates 1540, 1542, 1554 and 1556 may also be selectively enabled by the gates 1578, 1580, 1586 and 1550 during the blanking intervals to select synchronization from any one of the four video signals; however, the synchronization selection system is not part of the present invention and will not be discussed.

While certain preferred embodiments of the invention have been described by way of illustration, many modifications will occur to those skilled in the art; it will be understood, of course, that it is not desired that the invention be limited thereto, since modifications may be made, and it is, therefore, contemplated by the appended claims to cover any such modifications as fall within the true scope and spirit of the invention.

What is claimed as new and desired to be secured by Letters Patent of the United States is:

1. A video special effects generator for controlling the combining of video input signals into a video output signal under the control of horizontal and vertical synchronizing signals, said generator comprising:

means for generating a series of first digital representations including a source of periodic signals, means for counting said periodic signals, means for generating a variable width signal, means for generating a fixed width signal and means operatively coupled to said variable width signal generating means and said fixed width signal generating means for rendering said counting means operative to count said periodic signals only upon the existence of a predetermined time relationship between said fixed and said variable width signals;

means responsive to horizontal synchronizing signals for generating a second digital representation having a value corresponding to the time elapsed since the most recent horizontal synchronizing signal;

means responsive to vertical synchronizing signals for generating a third digital representation having a value corresponding to the elapsed time since the most recent vertical synchronizing signal;

digital signal comparing means responsive to said digital representations for generating an output control signal having a state dependent upon the relative values of various ones of the digital signal representations applied thereto;

video switching means for switching the video input signals into the video output signal under the control of the output signal generated by the digital signal comparing means; and means for altering the effect of various ones of said first, second and third signal representations on said output control signal to produce special effects controlled in accordance with said series of first digital representations.

2. A video special effects generator as recited in claim 1 further including second means for generating a variable width signal operatively coupled to said means for rendering said counting means operative, said last-mentioned means being responsive to said variable width signal generating means, said fixed width signal generating means and said second variable width signal generating means for rendering said counting means operative to count said periodic signals only upon the existence of a predetermined time relationship between said fixed width signal, said variable width signal and said second variable width signal.

3. A video special effects generator as recited in claim 1 wherein said means for rendering said counting means operative includes gating means responsive to said variable width signal for rendering said counting means operative to count said periodic signals, said gating means being further responsive to said fixed width signal for inhibiting the operation of said counting means for the duration of said fixed width signal.

4. A video special effects generator as recited in claim 3 further including means for generating a second variable width signal operatively coupled to said gating means for enabling the operation of said counting means only for the duration of said second variable width signal.

5. A video special effects generator as recited in claim 4 wherein each of said fixed and variable width signal generating means includes a monostable multivibrator responsive to one of said synchronizing signals for generating one of said fixed and variable width signals, respectively.

6. A video special effects generator as recited in claim 5 wherein said gating means is electrically coupled to said source of periodic signals and operative to pass said periodic signals when enabled by said first and second variable width signal and not inhibited by said fixed width signal.

7. A video special effects generator for controlling the combining of video input signals into a video output signal under the control of horizontal and vertical synchronizing signals, said generator comprising:

means for generating a series of first digital representations;

means for storing one of said series of first digital representations;

means operatively coupled to said first digital representation generating means and said storing means for comparing each of said series of first digital representations with said stored representation and rendering said storing means operative to store the last compared one of said series of first digital representations when the value of said last compared first digital representation differs from said stored first digital representation by a predetermined amount;

means responsive to horizontal synchronizing signals for generating a second digital representation having a magnitude corresponding to the time elapsed since the most recent horizontal synchronizing signal;

means responsive to vertical synchronizing signals for generating a third digital representation having a value corresponding to the time elapsed since the most recent vertical synchronizing signal;

digital signal comparing means responsive to said digital representations for generating an output control signal having a state dependent upon the relative values of various ones of the digital signal representations applied thereto;

video switching means for switching the video input signals into the video output signal under the control of the output signal generated by the digital signal comparing means; and means for altering the effect of various ones of said first, second and third signal representations on said output control signal to produce special effects controlled in accordance with said series of first digital representations.

8. A video special effects generator as recited in claim 7 wherein said means for comparing said first digital representations with said stored representations include means for adding the 2's complements of each of said first digital representations and said stored representations and providing a series of digital sum signals each representative of the sum of one of said first digital representations and said stored digital representation and means coupled to said adding means for comparing predetermined digits of said digital sum signal, said comparing means being operative to provide a loading signal to said storing means to render said storing means operative to store the last compared one of said first digital representations when the values of said compared predetermined digits of said sum are unequal.

9. A video special effects generator as recited in claim 8 wherein the predetermined digits of said digital sum signal include all digits thereof except the least significant digit.

10. A video special effects generator as recited in claim 8 wherein said comparing means includes gating means operatively coupled to said adding means, said gating means being operative to provide said loading signal whenever said predetermined digits of said sum are not all ones or all zeros.

11. A video special effects generator for controlling the combining of video input signals into a video output signal under the control of horizontal and vertical synchronizing signals, said generator comprising:

means for generating a series of first digital representations;

means responsive to horizontal synchronizing signals for generating a second digital representation having a value corresponding to the time elapsed since the most recent horizontal synchronizing signal;

means responsive to vertical synchronizing signals for generating a third digital representation having a value corresponding to the time elapsed since the most recent vertical synchronizing signal;

digital signal comparing means responsive to said digital representations for generating an output control signal having a state dependent upon the relative values of various ones of the digital signal representations applied thereto;

means coupled to said comparing means for reversing the dependency of the state of said output control signal upon the relative values of the digital signal representations supplied to said signal inputs;

video switching means for switching the video input signals into the video output signal under the control of the output control signal generated by the digital signal comparing means; and means for altering the effect of various ones of said first, second and third signal representations on said control signal to produce special effects controlled in accordance with the series of first digital representations.

12. A video special effects generator as recited in claim 11 wherein said state dependency reversing means includes means coupled to said comparing means for selectively inverting one of the digital representations applied to said comparing means.

13. A video special effects generator as recited in claim 12 wherein said inverting means includes means for selectively inverting said first digital representation.

14. A video special effects generator as recited in claim 13 wherein said first digital representation inverting means includes a plurality of exclusive NOR gates interposed between said comparing means and said first digital signal representation generating means.

15. A video special effects generator for controlling the combining of video input signals into a video output signal under the control of horizontal and vertical synchronizing signals said generator comprising:
   means for generating a series of first digital representations;
   means responsive to horizontal synchronizing signals for generating a second digital representation having a value corresponding to the time elapsed since the most recent horizontal synchronizing signal;
   means responsive to vertical synchronizing signals for generating a third digital representation having a value corresponding to the elapsed time since the most recent vertical synchronizing signal;
   digital signal comparing means responsive to said digital representations for generating an output control signal having a state dependent upon the relative values of various ones of the digital signal representations applied thereto;
   counting means for initiating a count in response to a change in the state of the output control signal from said digital comparing means, said counting means including means for providing an output signal representative of the time duration of said count;
   video switching means for switching one of the video input signals into the video output signal under the control of the output signal generated by said counting means; and
   means for altering the effect of various ones of said first, second and third signal representations on said control signal to produce special effects controlled in accordance with said series of first digital representations.

16. A video special effects generator as recited in claim 15 wherein said counting means includes a programmable counter and means for preprogramming an initial value into the counter for determining the duration of the count.

17. A video special effects generator as recited in claim 16 further including means operatively coupled to said counter for altering the preprogammed initial value to thereby alter the duration of the count.

18. A video special effects generator as recited in claim 16 wherein said counter has a predetermined capacity and said counting means includes gating means coupled to the output of said counter for terminating the count when the counter is filled to capacity.

19. A video special effects generator as recited in claim 16 further including a source of periodic signals operatively coupled to said counter, said counter being operative to count said periodic signals and responsive to each of said horizontal synchronizing signals for resetting the count to said preprogrammed initial value.

20. A video special effects generator as recited in claim 16 wherein said counter includes means for receiving said horizontal synchronizing signals, said counter being operative to count said horizontal synchronizing signals and responsive to each of said vertical synchronizing signals for resetting the count to said programmed initial value.

21. A video special effects generator for controlling the combining of video input signals into a video output signal under the control of horizontal and vertical synchronizing signals, said generator comprising:
   means for generating a first digital representation, said first digital representation generating means including means for generating a single binary digit;
   means responsive to horizontal synchronizing signals for generating a second digital representation having a value corresponding to the time elapsed since the most recent horizontal synchronizing signal;
   means responsive to vertical synchronizing signals for generating a third digital representation having a value corresponding to the time elapsed since the most recent vertical synchronizing signal;
   digital signal comparing means responsive to said digital representations for generating an output control signal having a state dependent upon the values of the second and third signal representations relative to the value represented by the single binary digit; and
   video switching means for switching the video input signals into the video output signal under the control of the output signal generated by the digital signal comparing means for generating a special effect controlled in accordance with said first digital representation.

22. A video special effects generator as recited in claim 21 wherein said video switching means includes means for alternately switching four video input signals into the video output signal to provide a composite video signal containing portions of each of the four video input signals.

23. A video special effects generator as recited in claim 22 wherein each of said second and third digital representations has a predetermined maximum value, and wherein said first digital representation has a value substantially equal to one half of the maximum value of each of said first and second digital representations.

24. A video special effects generator as recited in claim 23 wherein the maximum value of said first and second digital representations is equal to 255 and wherein the value represented by said single binary digit is equal to 128.

25. A video special effects generator as recited in claim 22 further including means for generating a series of fourth digital representations and means for selectively applying one of said first and series of fourth digital representations to said digital signal comparing means, said digital signal comparing means being responsive to the values of the second and third signal representations relative to the value of the one of said first and series of fourth digital representations selectively applied thereto for generating the output control signal to provide a special effect controlled in accordance with one of said first and series of fourth digital representations.

26. A video special effects generator as recited in claim 25 wherein said fourth digital representation generating means includes means for selecting one of said fourth digital representations.

27. A video special effects generator as recited in claim 26 wherein said fourth digital representation selecting means includes means manually operable for selecting said fourth digital representation.

* * * * *